United States Patent

Teodorescu et al.

[11] 4,202,272
[45] May 13, 1980

[54] PNEUMATIC TRANSPORT APPARATUS AND METHOD OF PROPULSION

[75] Inventors: Constantin Teodorescu; Constantin Ceauselu; Stefan Ardeleanu, all of Bucharest, Romania

[73] Assignee: Institutul National Pentru Creatie Stiintifica Si Tehnica, Bucharest, Romania

[21] Appl. No.: 811,679

[22] Filed: Jun. 30, 1977

[30] Foreign Application Priority Data

Jul. 14, 1976 [RO] Romania ............................. 86971

[51] Int. Cl.² .......................... B61B 1/00; B61B 3/00; B61B 13/10; B61B 13/12
[52] U.S. Cl. .................................... 104/91; 104/28; 104/95; 104/135; 104/138 R; 105/150; 105/154
[58] Field of Search ............. 105/2 R, 150, 156, 365, 105/154; 104/20, 138 R, 138 G, 155, 28, 91, 95, 135; 243/32, 33, 39

[56] References Cited

U.S. PATENT DOCUMENTS

| 1,053,368 | 2/1913 | Eells | 104/155 |
| 1,198,605 | 9/1916 | Trent | 104/20 |
| 1,607,260 | 11/1926 | Kruckenberg | 104/138 R |
| 2,511,979 | 6/1950 | Goddard | 104/138 R |
| 3,403,634 | 10/1968 | Crowder | 104/138 R |

Primary Examiner—Robert R. Song
Assistant Examiner—Howard Beltran
Attorney, Agent, or Firm—Karl F. Ross

[57] ABSTRACT

A pneumatic transport system in which a continuous overhead rail extends through a plurality of transport stations. Transport tubes are arranged along the rail for high-speed travel of a vehicle which is suspended therefrom. Between the transport tubes, the vehicle rests upon driven rollers which propel the vehicle into the tubes and receive the vehicle after it leaves the tubes. In the stretches provided with these rollers, the rail approaches the rollers so that the vehicle rests upon the rollers and is only guided laterally by the rail. Within the tubes themselves, however, the vehicle is suspended from the rail generally out of contact with the walls of the tubes and is displaced through the latter by a pressure differential generated by suction devices.

3 Claims, 5 Drawing Figures

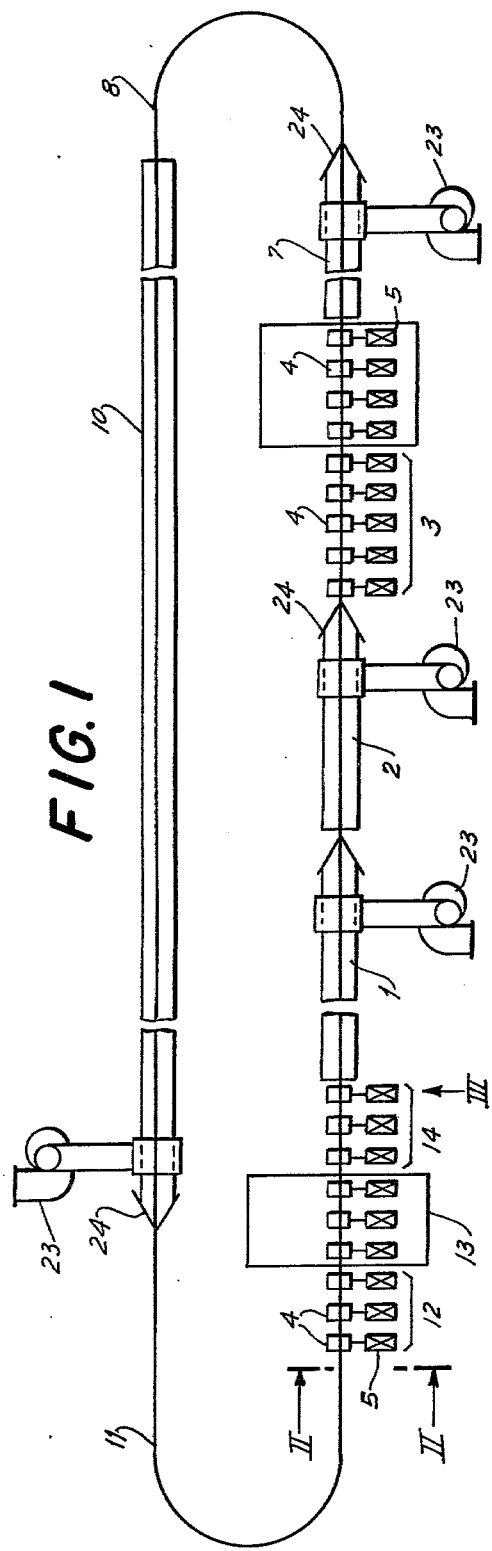
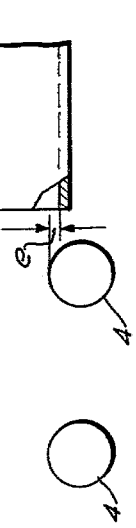
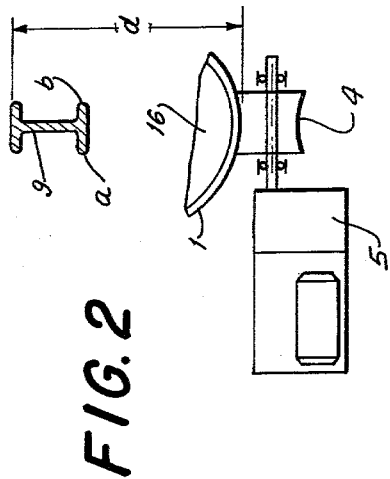

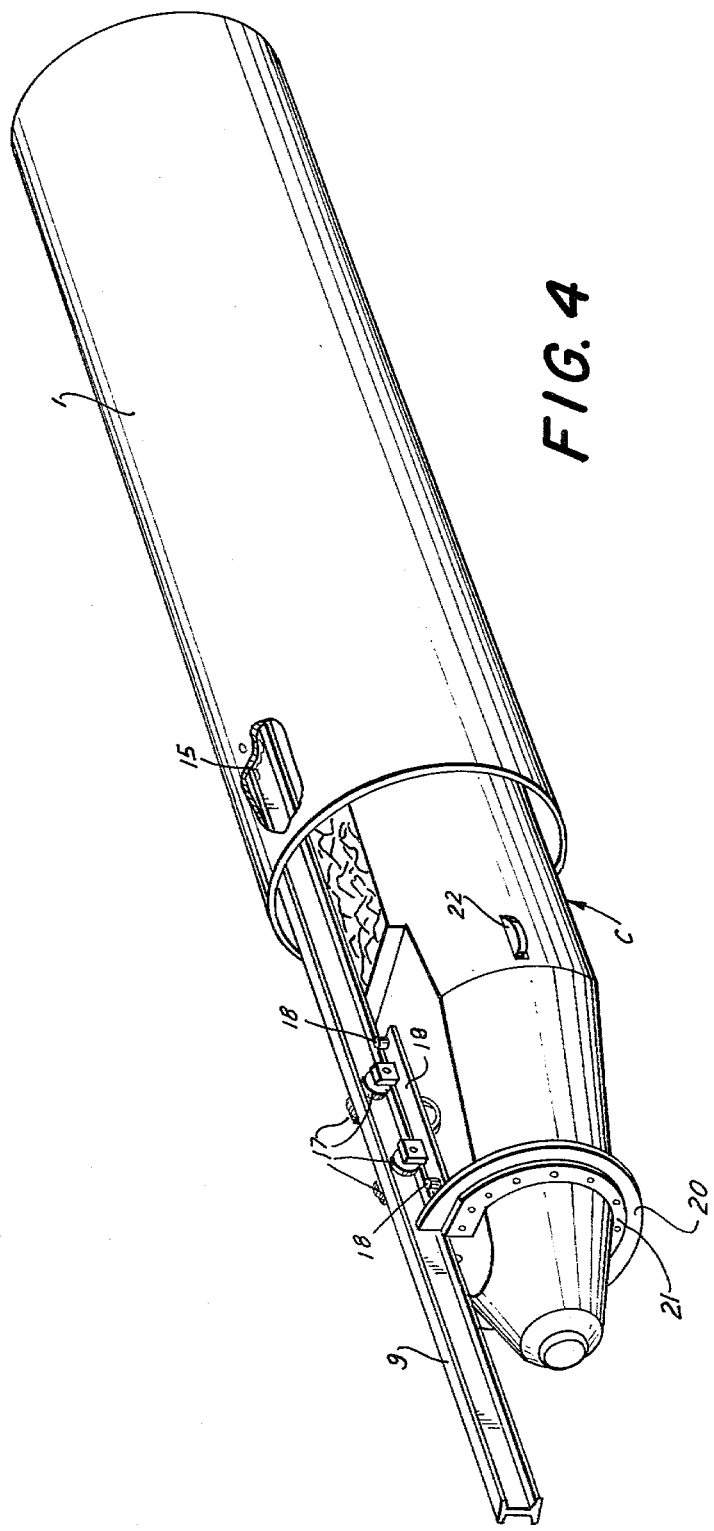

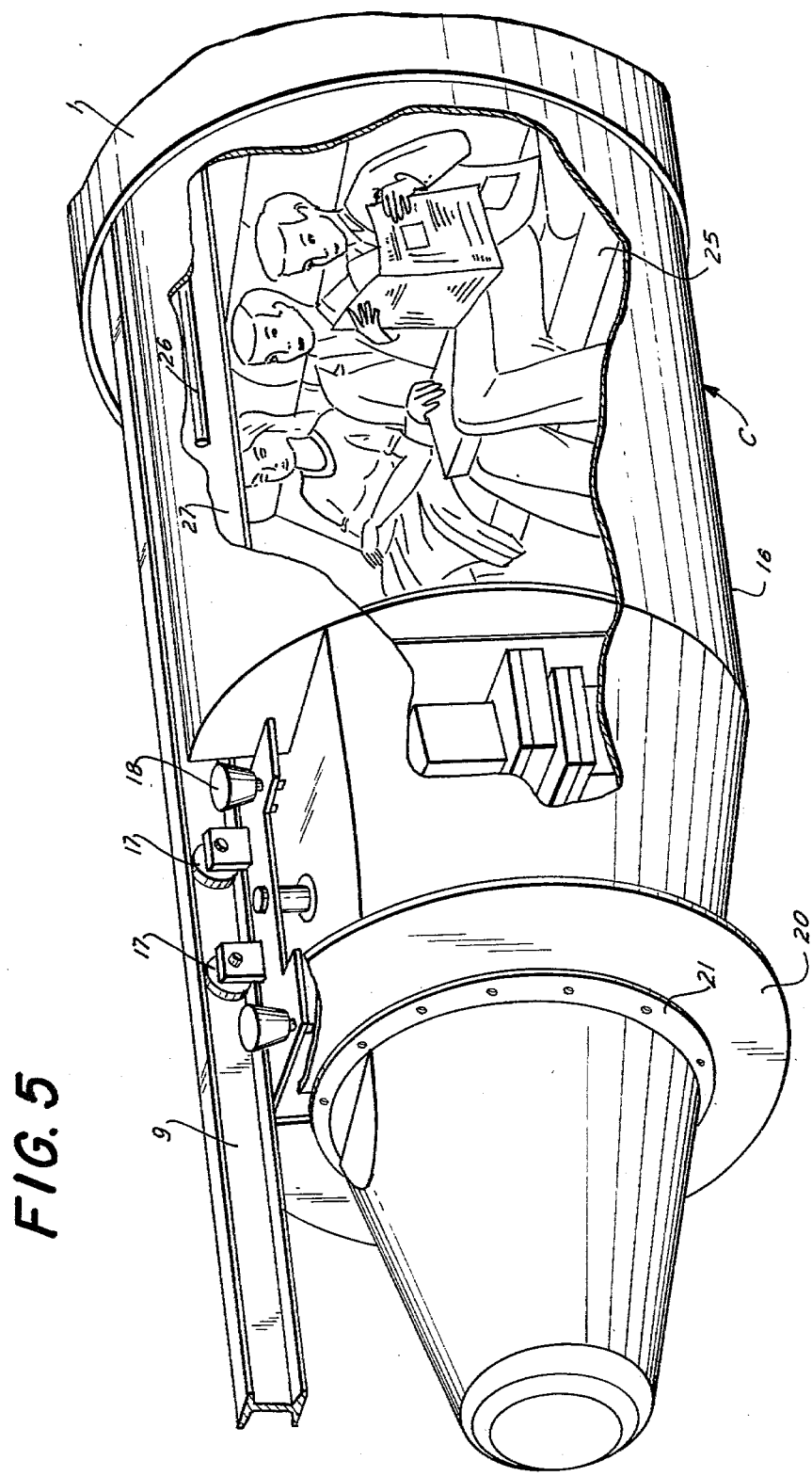

PNEUMATIC TRANSPORT APPARATUS AND METHOD OF PROPULSION

Field of the Invention

The present invention relates to a method of and an apparatus for pneumatically transporting containers which carry materials, goods or passengers inside a tubular passage which consists of a plurality of tubes located on the ground, underground or above the ground.

Background of the Invention

There is a known transport method that uses in a first phase the displacement of a container on some rollers mounted on the lower part and on opposite sides of a vehicle by a pushing force that is generated behind the vehicle, when a depression (suction) is created in front of it. The suction is created by withdrawing the air in the tube through several slits by means of an exhaustor (evacuator). In a second phase, after the vehicle has already travelled a certain distance along the tube, it is followed by an electromagnetic or a mechanical command that operates two flaps of a check valve, and the cycle is repeated with the passing of the container through another transport tube of the same apparatus.

This method has the disadvantage that all the necessary operations, such as: the lowering of the container speed, the stopping at a given point, the turning back of the containers and the repetition of the transport cycle, cannot always be performed effectively.

There is known an apparatus for the pneumatic transport of goods and materials which uses a number of transport tubes provided internally with rollers upon which the containers are propelled by means of exhaustors and check valves with movable flaps.

The disadvantage of the above-mentioned apparatus is that it has no means for controlling the containers within the stations for: braking, stopping at a given point, returning and propulsion into the transport tube.

There is another system for pneumatic transport that has a loading and an unloading station; these stations include a braking system located within a transport tube. The braking system stops the container within a certain interval and brings the container to a given point in the region of the loading or the unloading station by performing an inverse movement, the braking device being placed on a carriage parallel to one of the tubes, so that the container can leave the loading or the unloading station through this tube after the loading or the unloading operation has been effected. The disadvantage of this arrangement is that the stopping of the container at a given point is performed in a discontinuous way by stopping and reversing the direction of movement. Thus, the operating time is increased and the transport capacity of the plant is decreased.

Objects of the Invention

It is therefore an object of the present invention to provide an improved pneumatic transport system adapted to obviate the aforementioned drawbacks.

Summary of the Invention

The method according to the present invention obviates all the above mentioned disadvantages by propelling containers (vehicles) successively through pneumatic transport tubes according to a different procedure: while in the transport tube the containers run on and are supported by suspending wheel engaging an I-beam rail mounted in the upper part of the transport tube, while in entrainment zones as well as within loading and unloading stations, the containers are supported on their undersides by driven rollers and the rail is used only to guide the containers. Before entering a return transport tube, as well as before entering the entrainment zone, a zone which precedes the loading station, the unloaded containers, due to the inertia force, slide down along curves of the rail which is mounted on supports placed outside the transport tube. The container speed is controlled for stopping at a given point within the loading and the unnloading station by reducing the air feed or the air sucked from the stage tube which precedes the entrainment zone, and by using the drive rollers within the same zone, as well.

The apparatus comprises the tube for the transport of the loaded containers and the return tube for the transport of the unloaded containers, and tubes which are joined by aerial curves of the rail which is mounted on supports. In the lower part of the transport tube within the entrainment zones, as well as at the loading and the unloading stations, there are the several rollers which are driven by means of a geared motor and which include a coupling similar to a disengaging clutch. The rail is mounted above the driven rollers at a height so as to allow the container to be supported on its underside by the rollers.

Brief Description of the Drawing

The above and other objects, features and advantages of the invention will become more readily apparent from the following description, references being made to the accompanying drawing, in which:

FIG. 1 is a diagrammatic top view of the pneumatic transport system according to the invention;

FIG. 2 is a partial sectional view taken along line II—II of FIG. 1;

FIG. 3 is a side elevational view taken in the direction of arrow III of FIG. 1 showing a portion thereof drawn to a larger scale;

FIG. 4 is a perspective view of a portion of the system showing the vehicle emerging from a pneumatic transport tube; and FIG. 5 is a perspective view similar to that of FIG. 4 but with parts broken away to show the vehicle adapted for carrying passengers.

Specific Description

In accordance with the present invention, the apparatus includes at least one pneumatic transport tube 1 for propelling loaded transport containers, and a pneumatic transport tube 2 provided internally with a braking device (FIG. 1). The tube 2 may be upwardly inclined since it is that part of the plant where the speed of the loaded containers is to be reduced from a high value to a low value, the former being the travelling speed. Downstream of tube 2, there is an entrainment zone 3 provided with several rollers 4 which are driven by means of geared motors 5 and which include disengaging clutches (not shown). Next is an unloading station 6 provided in its turn with rollers 4 driven by geared motors 5 to guide the containers inside the unloading station 6. The unloading station is followed by a tube 7 wherein the containers unloaded at the unloading station are further accelerated.

The plant according to the present invention also includes a curve 8 made by an I-beam rail 9 suspended on supports (not shown), a return transport tube 10 downstream of curve 8 for the unloaded containers, another curve 11 downstream of tube 10 made by the same rail 9, then a second entrainment zone 12 and a loading station 13, both provided with driven rollers 4 with geared motors 5. There is also a third entrainment zone 14, downstream of station 13 provided with driven rollers and geared motors, it being a zone where the loading of the container may be controlled.

The apparatus of FIG. 1, including the tubes 1, 2, 7, 10, the entrainment zones 3, 12, 14, the unloading station 6, the curves 8, 11 and the loading station 13, is provided along the entire length with the rail 9 with supports therefore, the rail 9 being mounted inside the tubes 1, 2, 7, 10 by; means of fasteners 15 such as screws and nuts and the same rail mounted outside the tubes suspended on the supports.

The containers (vehicles) 16 run on the two flanges a and b of the rail 9 through the tubes 1, 2, 7 and 10. The containers 16 are provided at each end with four suspending wheels 17 and four guiding wheels 18, mounted on a support 19. The support 19 is mounted on the container 16 by a pivot which ensures the mobility of the former with respect to the container 16. The container 16 is provided at each end with a rubber packing 20 which is mounted by means of a flange 21, in order to be drawn into the interior of the tubes 1, 2, 7, 10 by the pressure differential between its ends.

The container 16 is also provided at each end with another pair of rollers 22, mounted on ball bearings (not shown) in the median plane of the container 16 so that the accidental contacts between the container and the interior wall of the transport tube take place only through the intermediary of the rollers 22.

The container 16 has the lower surface c raised above the inner wall of the transport tube by a distance e so as to be able to pass through the tube without touching the wall when the container is suspended from the rail. In the entrainment zones 3, 12, 14 and in the loading station 13 and the unloading station 6 as well, the rail 9 is spaced above the rollers 4 at a height d, which is slightly less than the distance between surface c and the upper surfaces of flanges a and b, (FIG. 2) so as to allow the drive rollers 4 to support the entire weight of the container 16 on the latters's underside c. Thus the drive rollers 4 may have either a braking effect or a driving effect upon the container 16, since the suspending wheels 17 are lifted from flanges a and b and do not take the weight of the container within these zones, and the rail 9 is used only to guide the container 16 by the guiding wheels 18. When the loaded containers 16 pass from the entrainment zone 14 into the transport tube 1, or when the same but unloaded containers 16 pass from the unloading station 6 into the accelerating tube 7, they are entrained by the drive rollers 4 and supported by the rail 9 by means of the suspension wheels 17. To accomplish this, the distance between the upper surface of the drive rollers 4 where they are positioned immediately upstream of tubes 1 and 7, and the lower surface of the interior wall of the tube is equal to the distance of e (FIG. 3) so as to allow the containers 16 to pass into the transport tube fully supported by rail 9 and clearing the wall of the tube.

The containers 16 are propelled in the interior of the stage tubes 1, 2, 7 and 10 by the reduced pressure produced by means of the exhaustors 23 which suck the air from the tubes from a downstream location situated adjacent movable flaps 24. The speed of the container 16 has different values in the stage tubes 1, 2, 7 or 10, depending on the air output the exhaustors 23 are adjusted for.

In the case where the loading station 13 and the unloading station 6 are used as stations where passengers get on and off the containers 16, the containers 16 include, as shown in FIG. 5, seats 25, lighting equipment 26, and ventilation and heating ducts 27. In this version, the apparatus according to the present invention may be used for pneumatic transport along a closed-circuit path and takes place as follows:

In operation, the loading of the container 16 takes place within the loading station 13. Then the loaded container 16 is driven out of the loading zone by means of the driven rollers 4 and is driven into the entrainment zone 14, where the container 16 is checked to ensure that it was properly loaded. If the container 16 was not properly loaded, it may be stopped in this zone by stopping the geared motors 5 of the rollers 4.

From the entrainment zone 14, the container 16 passes into the interior of transport stage tube 1 wherein it rides on the flanges a and b of the rail 9, this time being propelled by the suspension wheels 17 and no longer supported on its underside c by rollers 4 as in the entrainment zone. The container 16 is propelled in the interior of the transport stage tube 1 due to the depression produced here by means of the exhaustor 23 and the movable flaps 24.

In order to obtain an efficient transport line using a small number of containers, it is necessary to attain a high transport speed inside the transport stage tube 1. If an adequately high air feed is used for the pneumatic propulsion, it is possible to attain such a high transport speed.

The container passes into the transport tube 2, where the speed of the container is lowered due to the ascending slope of the tube 2 and, also, due to the fact that, within this tube, the air feed for the pneumatic propulsion is adjusted for this lowered speed.

Upon passing out of the transport tube 2, the container 16 comes into contact on its underside c with the driven rollers 4 of the entrainment zone 3 wherein it attains a low speed equal to the peripheral speed of the entraining rollers 4. This is the speed of the container 16 when entering the unloading station 6, wherre it is stopped and unloaded. After the container 16 passes the unloading station 6, it will enter the acceleration tube 7 by means of the driven rollers 4 present within this tube and will run beyond by means of the suspension wheels 17 on the rail 9 where the container 16 is accelerated till it attains a certain speed so as to allow it to go out of the accelerating tube 7, to run through the curve 8 made by the rail 9 and to enter the return stage tube 10. Due to the pneumatic propulsion, the container 16 attains a high speed inside the tube 10 for the return trip. As the container 16 goes out of the return stage tube 10, it runs on the curve 11 lowering its speed. Then it enters with a low speed on the driven rollers 4 into the entrainment zone 12 wherein it attains a lower speed equal to the peripheral speed of the driven rollers 4. This is the speed of the container 16 when entering the loading station 13 where it is stopped, loaded and sent further on in order to start again the cycle described above.

According to the present invention, the apparatus presents the following advantages:

It allows an increase in the efficiency of transport as a number of containers in continuous flow are used eliminating the lost time brought about by the intermittent operation of the containers;

It allows the following problems to be solved: the stopping of the containers at a given point within the loading and the unloading stations; the automatic operation of the containers within the above mentioned stations; the return of the containers on the curves within the closed circuit arrangement.

We claim:

1. A pneumatic transport system comprising:
   a continuous profiled overhead rail defining a vehicle path extending over a plurality of entrainment stations;
   a plurality of pneumatic transport tubes enclosing said rail at spaced intervals therealong between said entrainment stations;
   at least one vehicle suspended from said rail and displaceable therealong, said vehicle being dimensions to pass through said tubes generally spaced therefrom and provided with suspending wheels rollingly supported upon said rail and lateral guide wheels flanking said rail;
   means for generating a reduced pressure in said tubes to pneumatically displace said vehicle therethrough;
   arrays of drive rollers provided at said stations and adjacent thereto, said drive rollers being disposed directly beneath said rail and spaced therefrom by a distance such that said vehicle rides on said drive rollers and is lifted thereby, disengaging said suspending wheels from said rail, said vehicle being guided along said rail by said guide wheels and supported by said drive rollers; and
   means for driving said drive rollers to propel said vehicle through said stations into said tubes.

2. The system defined in claim 1 wherein said vehicle is adapted to transport passengers, said vehicle including a body, a plurality of seats on said body, lighting means for illuminating the interior of said body and a plurality of lateral rollers mounted on said body in the median plane thereof for engagement with the walls of said tubes during lateral displacement of said body.

3. A method of operating a pneumatic transport system in which a vehicle suspended from an overhead rail is displaced and guided therealong through a plurality of entrainment stations and spaced-apart transport tubes disposed between said stations, said method comprising the steps of:
   (a) pneumaticallly propelling said vehicle in said tubes substantially out of contact with the walls thereof; and
   (b) at said stations along said rail, causing said vehicle to come to rest upon arrays of drive rollers disposed beneath said rail so that said vehicle is lifted and no longer suspended from said rail, said drive rollers supporting said vehicle and propelling same through said stations, said vehicle being continuously guided by said rail.

* * * * *